United States Patent [19]
Haag et al.

[11] 3,821,278
[45] June 28, 1974

[54] OXIDATIVE DEHYDROGENATION OF PROPIONITRILE TO AERYLONITRILE

[75] Inventors: Werner O. Haag; Joseph N. Miale, both of Trenton, N.J.

[73] Assignee: Mobile Oil Company, New York, N.Y.

[22] Filed: Feb. 9, 1970

[21] Appl. No.: 10,022

[52] U.S. Cl....... 260/465.9, 260/486 D, 260/586 R, 260/593 R, 260/642, 260/683 R
[51] Int. Cl.................... C07c 121/02, C07c 121/32
[58] Field of Search................................ 260/465.9

[56] References Cited
UNITED STATES PATENTS

| | | | |
|---|---|---|---|
| 3,373,213 | 3/1968 | Pasternak et al. | 260/666 |
| 3,399,243 | 8/1968 | Boswell | 260/669 |
| 3,403,192 | 9/1968 | Vadekar et al. | 260/666 |
| 3,429,943 | 2/1969 | Trevillyan et al. | 260/683.3 |

*Primary Examiner*—Joseph Paul Brust
*Attorney, Agent, or Firm*—A. L. Gaboriault

[57] ABSTRACT

Catalytic process for the oxidative dehydrogenation of paraffins (e.g., isobutane) or substituted paraffins (e.g., propionitrile) by reaction with carbonyl sulfide, at 300° – 700°C. in the presence of alumina or a Group II-A metal oxide to form the corresponding olefin (e.g., isobutene).

1 Claim, No Drawings

OXIDATIVE DEHYDROGENATION OF PROPIONITRILE TO ACRYLONITRILE

BACKGROUND OF THE INVENTION

This invention relates to the production of olefins. More specifically, the invention is for a catalytic process for producing olefins by oxidative dehydrogenation of the corresponding paraffin hydrocarbon.

As is well known to those familiar with the art, the catalytic dehydrogenation of gaseous paraffins to produce corresponding olefins has been carried out in the past over metal catalysts such as nickel, platinum, iron, cobalt, copper, etc., but such catalysts have been found to be generally unstable and produced secondary cracking reactions. While high conversion per pass is a necessary condition for economic operation, by keeping recycle at a minimum, and it is known in catalytic dehydrogenation that the olefin content at equilibrium can be increased by raising the temperature, in practice, the use of very high temperature is limited because of increasing costs of suitable materials of construction and the rapid loss of selectivity resulting from a sharp increase in undesirable side reactions.

It is further well recognized in this art that in contrast to the paraffins, the dehydrogenation of alkyl-aryl hydrocarbons, such as ethylbenzene to styrene, is in general easily accomplished with the use of a wide variety of catalysts and even thermally without any catalyst, although with poor yields, as pointed out by K. K. Kearby in chapter 10 of "Catalysis Vol. III Hydrogenation and Dehydrogenation" Emmett, Editor — Reinhold Publishing Corporation 1955, page 481. It is concluded therefrom that it is not surprising that many dehydrogenating components have been found effective for the dehydrogenation of alkyl-aryl hydrocarbons.

The application of such catalyst systems for the dehydrogenation of paraffins for the production of olefins has been found to be less effective and more difficult, particularly with respect to selectivity and yield. Comparison of the results of the use of similar catalyst systems applied to both paraffins and ethylbenzene may be found in the recently issued U.S. patents to Pasternak et al., 3,373,213, Mar. 12, 1968, and to Vadekar et al., 3,403,192, Sept. 24, 1968, wherein both paraffins and ethylbenzene are dehydrogenated. Consideration in U.S. Pat. No. 3,373,213 of the results of Example 1 directed to butane, with Example 2 of that patent to ethylbenzene and in U.S. Pat. No. 3,403,192 of Examples 9, 11 and 13 to paraffins with Examples 10, 14 and 16 to ethylbenzene, shows a consistently greater efficiency of the dehydrogenations applied to ethylbenzene than in the case of the paraffins, particularly in selectivity and yield.

The recently issued patent to Boswell, U.S. Pat. No. 3,399,243, Aug. 27, 1968, is directed to an oxidative dehydrogenation of alkyl aromatic compounds by reaction with carbonyl sulfide in the presence of alumina or a Group II-A metal oxide, a catalyst system similar to that employed herein. The Boswell patent is, however, limited to the dehydrogenation of alkyl-aryl compounds.

The U.S. Pat. No. 3,429,943 issued to Trevillyan et al. discloses conversion of paraffins to olefins by reacting them with carbonyl sulfide in the absence of catalyst. They used excess hydrocarbon and very long contact times. Conversion drops rapidly with contact time while adverse selectivity effects are incurred by increasing temperature to achieve higher conversion.

SUMMARY OF THE INVENTION

We have found that olefins, useful in making polyolefins can be produced in high yields at a relatively high rate of conversion per pass by a process that is simple and economically feasible. It has been discovered that in the presence of certain metal oxide catalysts, olefins can be produced by the catalytic dehydrogenation of paraffins with carbonyl sulfide or suitable precursors thereof which will form carbonyl sulfide in situ.

The present invention provides a method for producing olefins by contacting a paraffin hydrocarbon with carbonyl sulfide over a catalyst selected from the group consisting of alumina and Group II-A metal oxides.

DESCRIPTION OF SPECIFIC EMBODIMENTS

The paraffin hydrocarbon reactants to which the present process is applied are alkanes and substituted alkanes containing from two to twelve carbon atoms, and may be primary, secondary or tertiary alkanes, containing at least one —CH—CH— group. As examples of such paraffins and substituted paraffins, but not limited thereto, may be mentioned ethane, propane, isobutane, propionitrile, methylethyl ketone, methylisobutyrate, sec.-butanol, cyclopentanone.

The present process is an oxidative dehydrogenation which may, in general, be described by the reaction

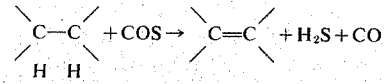

The carbonyl sulfide, acting as the oxidant may be added directly, as such, or may be formed by addition of suitable reagents which form carbonyl sulfide in situ, such as a mixture of carbon monoxide and sulfur, hydrogen sulfide and carbon monoxide, or carbon dioxide and carbon disulfide. Accordingly, throughout the specification and claims, "carbonyl sulfide" is embracive of carbonyl sulfide whether formed outside of the reactor or in situ.

While in accordance with the above reaction, the carbonyl sulfide reacts with the paraffin hydrocarbon in equimolar quantities, it is desirable to use a molar excess of carbonyl sulfide. In general, the molar ratio of carbonyl sulfide to paraffin hydrocarbon may be between 1:1 and 5:1.

The catalyst, employed in accordance with this invention are alumina and the oxides of the metals of Group II-A of the Periodic Chart of the Elements, i.e., Be, Mg, Ca, Sr and Ba or mixtures thereof. Magnesium oxide is a particularly preferred catalyst. The Periodic Chart of the Elements referred to is that on pages 56 and 57 of Lange's "Handbook of chemistry," Ninth Edition, 1956, Handbook Publishers, Inc., Sandusky, Ohio.

The process of the invention can be carried out batchwise, but it is more feasible to use a continuous operation. The temperature employed can be between about 300°C. and about 700°C. It is generally preferred to operate between about 500°C. and about 600°C. The process proceeds readily to good yields at atmospheric pressure, but sub-atmospheric or superatmospheric pressures can be used.

EXAMPLE 1

A series of runs was carried out at various temperatures and at atmospheric pressure using a catalyst bed of magnesia heated to the desired run temperature. Prior to use the catalyst was calcined at 600°C. of 0.5 hour under a nitrogen atmosphere. In each run carbonyl sulfide and isobutane were charged in molar ratios of three moles of carbonyl sulfide to per mole of isobutane, or in equimolar ratios. Pertinent data are listed in Table I.

TABLE I

Isobutane and Carbonyl Sulfide over MgO

| Temp. °C | Contact Time seconds | Mole Ratio COS/iB | % Conversion | % Selectivity[a] |
|---|---|---|---|---|
| 482 | 17 | 3 | 29 | 99 |
| 538 | 17 | 3 | 50 | 96 |
| 593 | 17 | 3 | 60 | 95 |
| 538 | 17 | 3 | 50 | 96 |
|  | 34 | 3 | 61 | 93 |
|  | 68 | 3 | 71 | 92 |
|  | 136 | 3 | 76 | 92 |
| 538 | 17 | 1 | 46 | 98 |
|  | 34 | 1 | 68 | 95 | a. % Selectivity = (% isobutene/% conversion) × 100.

EXAMPLE 2

A series of runs was carried out, as described in Example 1, except that propane was used in place of isobutane and the molar ratio of carbonyl sulfide to propane was 3. Pertinent data are set forth in Table II.

TABLE II

Propane and Carbonyl Sulfide (1:3 mole ratio)

| Catalyst | Temp.°C | Contact Time seconds | % Conversion | % Selectivity[a] |
|---|---|---|---|---|
| MgO | 538 | 17 | 20 | 93 |
|  |  | 34 | 29 | 92 |
|  |  | 68 | 36 | 90 |
|  |  | 136 | 40 | 90 |
|  | 593 | 17 | 40 | 92 |
|  |  | 34 | 55 | 82 |
|  |  | 68 | 72 | 70 |
|  |  | 136 | 80 | 55 | a. % Selectivity = (% propene/% conversion) × 100.

From the data in Tables I and II, it will be apparent that carbonyl sulfide in the presence of magnesia effectively converts isobutane and propane to respectively, isobutylene and propylene. Favorable rates of conversion occur at 500°–600°C. and selectivity is extremely high.

EXAMPLE 3

A series of runs was carried out as described in Example 1, except alumina was used as the catalyst in place of magnesia.

Although selectivity was high at lower temperatures and lower conversion rates, selectivity dropped at higher temperatures. The alumina used in these runs, however, was a commercial catalyst that contained a very small amount (in the order of 0.1 weight percent) of silica. The small amount of silica would form acidic sites, which would account for the formation of byproducts. It will be noted that as the catalyst aged (and thus became less acidic) the selectivity increased. Thus, if a pure alumina, such as can be formed from an aluminum alcoholate by known methods, is used it would be expected that higher selectivity will be achieved.

EXAMPLE 4

A series of runs was carried out with magnesia catalyst as described in Example 1, except that propionitrile was used in place of isobutane and the molar ratio of carbonyl sulfide to propionitrile was 2. The liquid hourly space velocity was 0.5. Pertinent data are set forth in Table III.

TABLE III

| °C | % Conversion | % Selectivity[a] |
|---|---|---|
| 593 | 32 | 96 |
| 621 | 40 | 94 |
| 648 | 51 | 91 | a. % selectivity = (% acrylonitrile/% conversion) = 100.

EXAMPLE 5

A series of runs was carried out with magnesia catalyst as described in Example 1, except methylisobutyrate (MIB) was used in place of isobutane to produce methyl methacrylate (MMA) at 538°C. Pertinent data are set forth in Table IV.

TABLE IV

| Mole Ratio COS:MIB | LHSV, V/H/V | % MMA | % Conversion | % Selectivity |
|---|---|---|---|---|
| 3 | 0.2 | 30.1 | 34.6 | 87 |
| 3 | 0.1 | 43.2 | 51.6 | 84 |
| 3 | 0.067 | 42.2 | 54.7 | 77 |
| 2 | 0.33 | 26.3 | 29.4 | 90 |
| 0 | 0.33 | 9.9 | 22.0 | 44 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for producing acrylonitrile which comprises contacting carbonyl sulfide and propionitrile with a catalyst wherein said catalyst is magnesia, at a temperature between about 300°C and about 700°C and at a molar ratio of carbonyl sulfide to propionitrile of at least 1:1.

* * * * *

PO-1050
(5/69)

UNITED STATES PATENT OFFICE
CERTIFICATE OF CORRECTION

Patent No. 3,821,278          Dated     June 28, 1974

Inventor(s)    WERNER O. HAAG and JOSEPH N. MIALE

It is certified that error appears in the above-identified patent and that said Letters Patent are hereby corrected as shown below:

Title page, first column, line 2      "AERYLONITRILE" should be --ACRYLONITRILE--.

Title page, first column, line 5,      "Mobile Oil Company" should be --Mobil Oil Corporation--.

Column 4, line 25,      " = 100. " should be -- x 100. --.

Signed and sealed this 8th day of October 1974.

(SEAL)
Attest:

McCOY M. GIBSON JR.          C. MARSHALL DANN
Attesting Officer            Commissioner of Patents